(No Model.)

W. HALKYARD.
ELECTRIC CABLE.

No. 289,092. Patented Nov. 27, 1883.

Soft metal coating

WITNESSES:
C. H. Leuther Jr.
Wm. L. Cook

INVENTOR:
William Halkyard.
by Joseph A. Miller & Co
Atty's

UNITED STATES PATENT OFFICE.

WILLIAM HALKYARD, OF PROVIDENCE, RHODE ISLAND, ASSIGNOR OF ONE-HALF TO HENRY A. CHURCH, OF SAME PLACE.

ELECTRIC CABLE.

SPECIFICATION forming part of Letters Patent No. 289,092, dated November 27, 1883.

Application filed February 21, 1883. (No model.)

*To all whom it may concern:*

Be it known that I, WILLIAM HALKYARD, of the city and county of Providence, and State of Rhode Island, have invented a new and useful Improvement in Electric Cables; and I hereby declare the following to be a full, clear, and exact description of the same, reference being had to the accompanying drawings, forming part of this specification.

The object of this invention is to increase the strength and protect the armor of an electric cable.

The invention consists in protecting an electric cable by braiding a metallic wire armor around the insulated wires and coating the same with metal, as will be more fully set forth hereinafter.

Figure 1:
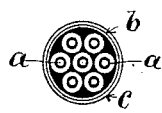
Figure 2:
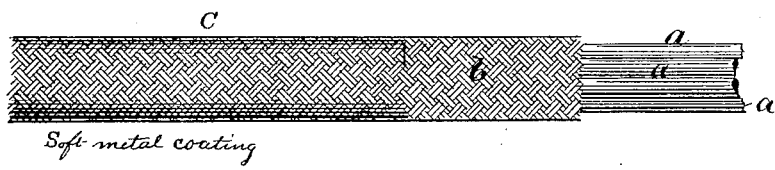

Figure 1 is a sectional view of an electric cable protected by a braided-wire armor, and Fig. 2 is a longitudinal view of the same.

In the drawings, *a a* are any desired number of insulated electric conducting-wires. *b* is a braided-wire armor placed over the united wires in a braiding-machine. *c* is a covering of tin, lead, or other metal.

The construction of the cable is as follows: Any desired number of insulated wires are formed into a cable and covered in a suitable braiding-machine with wire. The so-prepared cable is now passed through an acid bath to cleanse the armor, and then through fluid tin or lead, so as to cover the same with a thin coating of lead, tin, or similar metal, so that all the spaces are filled with the metal and a water-proof sheathing is produced. Any other method for tinning the cable may be used, or any other method best adapted to cover the braided armor with lead, as I do not wish to confine myself to any specific process, but wish to avail myself of any method known in the art of covering one metal with another. By thus covering the braided armor with a film of metal the armor is strengthened and protected, while the whole is impervious to moisture.

Having thus described my invention, I claim as new and desire to secure by Letters Patent—

An electric cable consisting of a number of insulated wires, a covering of metallic braid, and a coating of soft metal covering said braid and filling the interstices thereof, substantially as described.

WILLIAM HALKYARD.

Witnesses:
J. A. MILLER, Jr.,
M. F. BLIGH.